Oct. 18, 1932.  H. HALL  1,882,829
RELIEF PICTURE VIEWING SCREEN
Filed Oct. 29, 1930
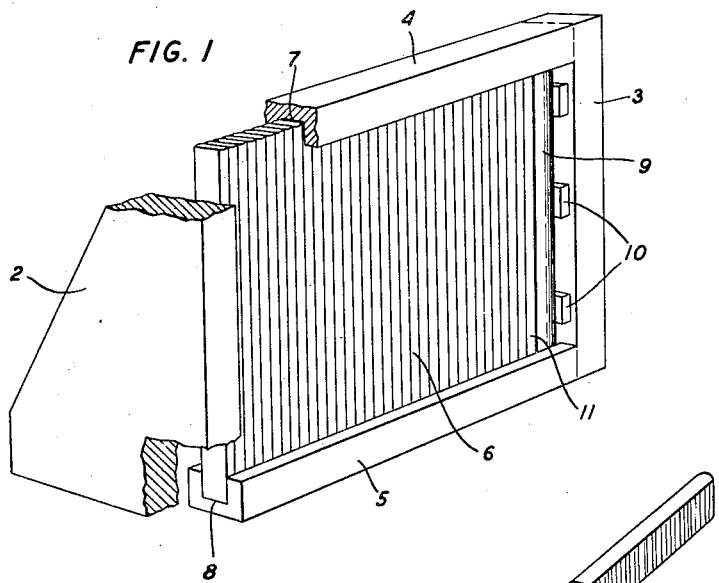
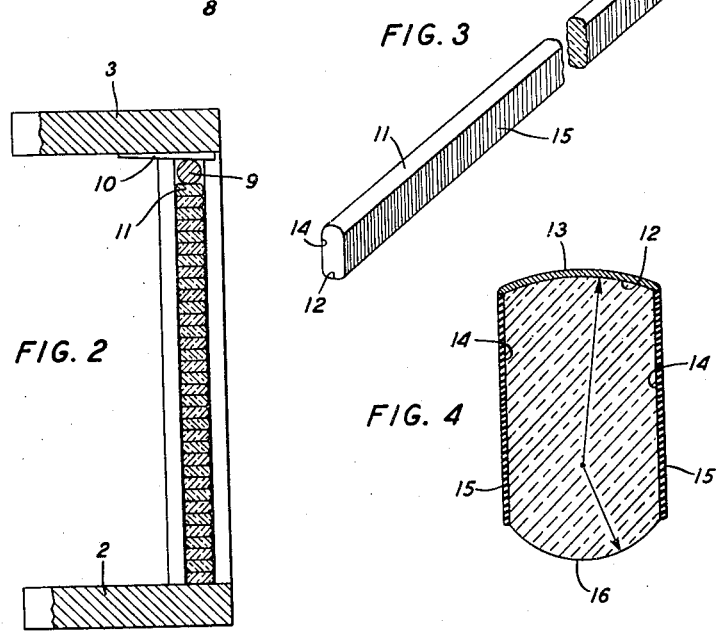
INVENTOR
H. HALL
BY Stanley B. Kent.
ATTORNEY Patented Oct. 18, 1932

1,882,829

UNITED STATES PATENT OFFICE

HOWARD HALL, OF NEW YORK, N. Y., ASSIGNOR TO BELL TELEPHONE LABORATORIES, INCORPORATED, OF NEW YORK, N. Y., A CORPORATION OF NEW YORK

RELIEF PICTURE VIEWING SCREEN

Application filed October 29, 1930. Serial No. 491,832.

This invention relates to the producing of pictures in stereoscopic relief and more particuluarly to a diffusing screen of opposed cylindrical ridges for producing the stereoscopic effect.

An object of the invention is to produce an improved form of diffusing screen for relief pictures.

A feature of the invention is a non-fragile transparent screen with an opaque backing and having a double ridged structure arranged for a uni-directional reflection of light to produce pictures in relief.

In accordance with the present invention a reflection screen is employed which is adapted for use in producing parallax panoramagram types of moving pictures such as disclosed in H. E. Ives application Serial No. 490,637, filed on October 23, 1930. This type of screen will reflect only one complete image for any chosen direction of observation. Further, since the images are to correspond to the original object for all directions of observation each image must be one projected along that same direction. In short the screen has the property of reflecting light back upon its source. This statement is true however only with respect to the horizontal plane in which the two eyes lie and in which the observer can move. Vertically the screen must diffuse light like an ordinary reflection screen.

According to a preferred example illustrative of this invention a composite screen is formed which consists of a series of lenticular celluloid strips arranged in parallelism, with their rear surfaces painted with an opaque material to effect reflection of the impinging light rays. Such an arrangement provides for a ridged structure on both sides of the screen since the celluloid strips have convex surfaces on the front and back. The relative curvature of the front and back surfaces depends upon the index of refraction of the material from which the lenticular strips are made.

For a material such as some types of glass having a refractive index of two the radii will be the same; i. e. the structure can consist of rods of circular cross-section. A composite screen can then be made by simply arranging these glass rods, of suitable length, side by side in some type of suitable frame for holding them in place. Such an arrangement is disclosed in the Ives application supra.

The above mentioned preferred form of screen is made of celluloid, which is a non-fragile material and one easily machined. To form a uni-directional reflection screen of this material the rear cylindrical ridges of the screen will not be the same as the front ridges since the index of refraction of this celluloid is less than 2.

The exact form of the surfaces necessary may be determined as set forth in the Ives application supra. If the front cylindrical ridges are made with a radius of curvature $s_1$, and the medium has a refractive index $n$, the thickness is given by the formula $$f = s_1\left(\frac{n}{n-1}\right).$$

The radius of curvature of the rear cylindrical ridges will be $$f - s_1 = \frac{s_1}{n-1}$$

the front and rear ridges having the same axis. For a refractive index of 1.5, the thickness will be three times and the rear cylinder radius twice, the front cylinder radius.

In a specific embodiment of the invention a number of strips approximately 24 inches long and $\frac{3}{16}$ inch wide are cut from a large sheet of $\frac{1}{8}$ inch celluloid of refractive index of substantially 1.5. The two original faces are then sand-blasted and painted with a flat back paint to give a non-reflecting wall. One edge of each strip is then given a cylindrical face of $\frac{1}{16}$ inch radius in a milling machine and the other edge a cylindrical face of $\frac{1}{8}$ inch radius, the total thickness being made $\frac{3}{16}$ inch. The small radius surface which is the front is carefully polished and the back surface of larger radius is coated with a silver lacquer for reflecting the light. A number of these prepared strips, 200 or more depending upon the size of the screen desired, are set side by side in slots formed on top and bottom cross-pieces, of a suitable upright frame. These strips are held firmly in place by a combination of a triangular wedge and drill rod causing increased pressure to be applied to the strips as the wedge is inserted.

The invention will now be described more in detail with reference to the accompanying drawing.

Fig. 1 is a perspective of one form of viewing screen embodying this invention.

Fig. 2 is a plan view of a transverse section from the center portion of the screen shown in Fig. 1.

Fig. 3 is a perspective of a single reflecting element of the type employed in this invention.

Fig. 4 is a front cross-sectional view of the reflecting element shown in Fig. 3.

Identical elements in the several figures are identified by the same reference characters.

Referring now to Fig. 1 a supporting frame 1 is maintained in an upright position and consists in general of standards 2 and 3 with connecting cross members 4 and 5. The reflecting elements 6 are positioned in a plane parallel to the upright standards 2 and 3 and are positioned on each end by slots 7 and 8 formed in cross members 4 and 5 respectively. The reflecting elements are held firmly in place by rod 9 and wedges 10. The relative positions of the rod 9, wedges 10, and reflecting elements 6 are shown in detail in Fig. 2. The rod 9 is positioned in the frame 1 between the upright piece 3 and the end reflecting element 11, in a position parallel to the latter, and the wedges 10 inserted at an angle between the said rod and upright piece.

Figs. 3 and 4 show the details of one of the reflecting elements 6. Each of the elements consist of a transparent polished face 16 with cylindrical curvature of a certain degree, a rear surface 12 of cylindrical curvature but of lesser degree and painted with an opaque reflecting material 13 and two substantially parallel sides 14 painted with a non-reflecting material 15.

According to a preferred example illustrative of this invention a viewing screen is made up in the following manner. A number of strips of approximately two feet in length and three-sixteenths inches in width are cut from a large sheet of one-eighth inch celluloid of refractive index of approximately 1.5. See Figs. 3 and 4. The two original faces 14 of each strip are sand-blasted and painted with a black non-reflecting material 15 to give a non-reflecting wall. One edge of each strip is given a cylindrical face 16 of approximately one-sixteenth inch radius in a milling machine using a high speed slow feed cutting tool, the other edge a cylindrical face 12 of one-eighth inch radius. The total thickness between the two cylindrical faces being made three-sixteenths of an inch while the thickness between the two flat original faces is one-eighth of an inch. The front or small radius surface 16 is carefully polished while the back surface 12 is coated with an opaque reflecting silver lacquer 13. To make a screen two feet square two hundred of these strips are prepared according to the above description.

The finished strips are arranged in parallelism in a suitable frame such as shown in Fig. 1. The frame may be made of wood or any suitable metal, each strip being set in slots 7 and 8 cut in top and bottom cross members 4 and 5 respectively. A section of drill rod 9 or the like of approximately the same length and diameter as one of the strips 6 is placed in one end of the frame 1 parallel to the upright member 3 and between it and the end celluloid strip as shown in Fig. 2. A triangular shaped wedge 10 is then inserted at an angle between the drill rod 9 and the upright member 3 in such a manner that progressive insertion of the wedge causes increased pressure to be applied to the rod 9 and in turn to the strips 6 which causes the latter to be held firmly in place.

The composite screen assembly as described above is positioned in an upright manner as shown in Fig. 1 and is ready for use in producing either still or motion pictures in relief. This screen is applicable for use in relief picture apparatus such as disclosed in the Ives application supra. Its mode of operation is the same as that of the glass rod screen in the said Ives application.

It is to be understood that this invention is not limited to the use of celluloid for the reflecting strips but contemplates the use of any other transparent material which can be machined. The number and size of the strips is dependent only on the size of screen which it is desired to produce.

One specific embodiment of this invention has been disclosed but the scope of the invention is limited only by the following claims.

What I claimed is:

1. A relief picture viewing screen, comprising a plurality of separate elongated infrangible transparent elements arranged side by side, one exposed surface of each element being of a certain curvature, the opposite surface being of a different curvature, and a layer of light diffusing material formed on said opposite surface.

2. A screen for producing stereoscopic images, comprising a plurality of elongated lenticular celluloid strips arranged in parallelism in a vertical plane, each strip having one exposed transparent surface of different radial curvature from the opposed surface.

3. A relief picture viewing screen, comprising a plurality of separate elongated infrangible transparent elements arranged side by side, each element having substantially parallel side surfaces, a front cylindrical surface of a certain curvature, a rear cylindrical surface of a different curvature, a layer of black opaque material formed on at least one of said side surfaces, and a layer of light diffusing material formed on said rear cylindrical surface.

4. A relief picture reflecting screen comprising a plurality of separate elongated infrangible transparent elements arranged side by side, one exposed surface of each element being of a certain curvature and the opposite surface being of a different curvature, and opaque light diffusing and reflecting material covering the said opposite surface.

5. A relief picture screen, comprising a plurality of infrangible elongated lenticular elements arranged in parallelism, each element having a transparent front cylindrical surface of one degree of curvature, a rear light diffusing and reflecting cylindrical surface of a lesser degree of curvature, and two substantially parallel opaque side surfaces.

6. A relief picture reflecting screen comprising a supporting frame with parallel slotted top and bottom cross members, a plurality of elongated lenticular cylindrical light diffusing elements arranged side by side in contact with each other in said slotted members, a triangular shaped wedge member inserted in the frame, and a cylindrical rod disposed between said wedge and lenticular elements for holding the latter in place upon insertion of the wedge.

7. A relief picture viewing screen comprising a plurality of light diffusing elements, two parallel standards maintained in an upright position, two parallel cross members maintained in a horizontal position and connecting the said standards at top and bottom, each of said cross members having a slot in alignment with the slot in the other member, said light diffusing elements being positioned side by side in contact with each other in said slots, a cylindrical rod whose ends are positioned in said slots, and a triangular wedge inserted between said rod and one of said cross members.

8. A method of making a relief picture screen, comprising cutting elongated segments from a sheet of infrangible transparent material of thickness equal to that of the width of an element, forming the cut edges into coaxial cylindrical surfaces, coating at least one of the original surfaces with an opaque black material, producing on one of the cylindrical surfaces a layer of light diffusing material, and assembling in parallelism a plurality of said segments with the original surfaces adjacent to each other and the diffusing surfaces side by side.

9. A method of making a relief picture screen, which comprises cutting strips from a sheet of celluloid of thickness equal to that of the width of an element, forming the cut edges into coaxial cylindrical surfaces, coating the original surfaces with an opaque black material, coating one of the cylindrical surfaces with an opaque light diffusing material, and assembling a plurality of said strips in parallelism with the reflecting surfaces side by side.

10. A method of making a relief picture screen, which comprises cutting strips from a sheet of infrangible transparent material of thickness equal to that of the width of an element, forming the cut edges into coaxial cylindrical surfaces, producing on one of the cylindrical surfaces a layer of light diffusing material, coating the original surfaces with an opaque black material, and assembling a plurality of said strips with the said original surfaces side by side and the light diffusing surfaces adjacent to each other.

11. A method of manufacturing light reflecting elements for a relief picture screen. which comprises cutting elongated segments from a sheet of infrangible transparent material of thickness equal to that of the width of an element, machining one of the cut edges of each segment into a cylindrical surface of a certain degree of curvature, polishing said surface to increase its transparency, machining the other cut edge into a cylindrical surface of a lesser degree of curvature, coating said other surface with an opaque light reflecting material, and coating at least one of the original surfaces with an opaque non-reflecting material.

12. A relief picture viewing screen, comprising a plurality of separate elongated infrangible elements of transparent material arranged side by side, each element having coaxial cylindrical surfaces, and a layer of light diffusing material formed on one of said surfaces.

In witness whereof, I hereunto subscribe my name this 27th day of October, 1930.

HOWARD HALL.